(12) United States Patent
Balasubramanian et al.

(10) Patent No.: US 8,121,037 B2
(45) Date of Patent: Feb. 21, 2012

(54) FIXED MOBILE CONVERGENCE (FMC) WITH PDIF AND SIP GATEWAY

(75) Inventors: Srinivasan Balasubramanian, San Diego, CA (US); Leslie Chiming Chan, San Diego, CA (US); Murali B. Bharadwaj, San Diego, CA (US); Uppinder Singh Babbar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 476 days.

(21) Appl. No.: 12/474,062

(22) Filed: May 28, 2009

(65) Prior Publication Data

US 2009/0316672 A1    Dec. 24, 2009

Related U.S. Application Data

(60) Provisional application No. 61/057,123, filed on May 29, 2008.

(51) Int. Cl.
 *H04L 12/56* (2006.01)
(52) U.S. Cl. ....................................................... 370/235
(58) Field of Classification Search ........................ None
 See application file for complete search history.

(56) References Cited

U.S. PATENT DOCUMENTS

| | | | |
|---|---|---|---|
| 7,162,236 B2* | 1/2007 | Dorenbosch et al. | ...... 455/432.1 |
| 7,254,119 B2 | 8/2007 | Jiang et al. | |
| 7,330,453 B1 | 2/2008 | Borella et al. | |
| 2003/0145013 A1* | 7/2003 | Kovarik et al. | ............... 707/100 |
| 2004/0042423 A1 | 3/2004 | Borella et al. | |
| 2004/0267874 A1 | 12/2004 | Westberg et al. | |
| 2005/0021713 A1* | 1/2005 | Dugan et al. | .................. 709/223 |
| 2006/0039538 A1 | 2/2006 | Minnis et al. | |
| 2006/0130136 A1 | 6/2006 | Devarapalli et al. | |
| 2007/0019643 A1 | 1/2007 | Shaheen | |
| 2007/0243872 A1 | 10/2007 | Gallagher et al. | |
| 2007/0247395 A1 | 10/2007 | Barraclough et al. | |
| 2008/0095070 A1 | 4/2008 | Chan et al. | |
| 2010/0074172 A1 | 3/2010 | Fontaine et al. | |

FOREIGN PATENT DOCUMENTS

| | | |
|---|---|---|
| WO | WO02076049 A1 | 9/2002 |
| WO | WO2006138408 A2 | 12/2006 |
| WO | WO2007086812 A1 | 8/2007 |

OTHER PUBLICATIONS

3GPP TS 43.318: "3rd Generation Partnership Project; Technical Specification Group GSM/EDGE Radio Access Network; Generic Access Network (GAN); Stage 2 (Release 8)" Internet Article, [Online] Feb. 2008, pp. 1-122, XP002552032 Retrieved from the Internet: URL:http://www.3gpp.org/ftp/Specs/archive/43_series/43.318/43318-810.zip> [retrieved on Oct. 23, 2009] section 8.4.1.6.

(Continued)

*Primary Examiner* — Raj Jain
(74) *Attorney, Agent, or Firm* — Darren M. Simon

(57) ABSTRACT

Apparatus and methods are described for establishing a connection to a wireless subscriber network over a wireless LAN. A secure tunnel is established between a PDIF and a mobile station. Both voice and data calls are exchange via the tunnel. Voice calls are forwarded to a SIP GW while data calls are routed to the Internet.

11 Claims, 7 Drawing Sheets

OTHER PUBLICATIONS

"3rd Generation Partnership Project; Technical Specification Group Services and System Aspects; Support of Push service (Release 5); 3GPP TR 23.875" ETSI Standards, LIS, Sophia Antipolis Cedex, France, vol. 3-SA2, No. V5.1.0, Mar. 1, 2002, pp. 1-70, XP014033551 ISSN: 0000-0001 sections: 7.3.5.1, 7.6.1, 7.6.2.

Alcatel-Lucent: "Alignment of layout of access technology specific annexes" 3GPP Draft; C1-070864-Align, 3rd Generation Partnership Project (3GPP), Mobile Competence Centre; 650, Route Des Lucioles; F-06921 Sophia-Antipolis Cedex; France, vol, CT WG1, No. Warsaw, Poland; 20070402, Apr. 2, 2007, pp. 1-16, XP050025081 [retrieved on Apr. 2, 2007] p. 2-p. 3; p. 8-p. 9.

International Search Report and Written Opinion—PCT/US2009/045347, International Search Authority—European Patent Office—Oct. 27, 2009.

International Search Report and Written Opinion—PCT/US2009/045727, International Search Authority—European Patent Office—Nov. 6, 2009.

International Search Report and Written Opinion—PCT/US2009/045731, International Search Authority—European Patent Office—Nov. 30, 2009.

"Universal Mobile Telecommunications System (UMTS); 3GPP system to Wireles Local Area Network (WLAN) interworking; System description (3GPP TS 23.234 version 7.6.0 Release 7); ETSI TS 123 234" ETSI Standards, LIS, Sophia Antipolis Cedex, France, vol. 3-SA2, No. V7.6.0, Jan. 1, 2008, XP014040569 ISSN: 0000-0001 pp. 65-68.

Veltri L., et al., "Wireless LAN-3G Integration: Unified Mechanisms for Secure Authentication based on SIP" Communications, 2006. ICC'06. IEEE International Conference on, IEEE, PI, Jun. 1, 2006, pp. 2219-2224, XP031025394 ISBN: 978-1-4244-0354-7 right-hand column, line 4—p. 2223, left-hand column, line 5; figures 1-3.

* cited by examiner

US 8,121,037 B2

FIXED MOBILE CONVERGENCE (FMC) WITH PDIF AND SIP GATEWAY

CLAIM OF PRIORITY UNDER 35 U.S.C. §119

The present Application for Patent claims priority to Provisional Application No. 61/057,123 entitled "Fixed Mobile Convergence (FMC) Architectures" filed May 29, 2008, and assigned to the assignee hereof and hereby expressly incorporated by reference herein.

REFERENCE TO CO-PENDING APPLICATIONS FOR PATENT

The present Application for Patent is related to the following co-pending U.S. patent applications:

U.S. patent application Ser. No. 12/472,274 entitled "FMC for CDMA Network" filed May 26, 2009, assigned to the assignee hereof, and expressly incorporated by reference herein; and "Fixed Mobile Convergence (FMC) Architectures" having concurrently herewith, assigned to the assignee hereof, and expressly incorporated by reference herein.

BACKGROUND

1. Field

The application generally to routing voice and data traffic using tunneling.

2. Background

Mobile communication devices are no longer limited to simply making and receiving voice calls. Users of such devices want to access audio, video, text, and or other content from any location. Dual mode devices exist which enable a mobile device to operate using more than one type of communication network. For example, a device may be configured to use 802.11 WLAN and a 3G network.

3G networks provide subscription based service, and use a licensed spectrum to provide wireless coverage to its subscribers. 802.11 WLANs, by contrast, operate using an unlicensed spectrum. It would be desirable to provide access to the services of 3G networks while allowing connection over a WLAN.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to some aspects, a method for processing calls from a mobile station connecting to a 3G network over a wireless local area network (WLAN) comprises establishing a secure tunnel between the mobile station and a packet data internetworking function (PDIF) associated with the 3G network; receiving a call from the mobile station over the established tunnel; determining whether the call is a vice call or a data call; upon determining that the call is a voice call, routing the call to a SIP GW; and upon determining that the call is a data call, routing the call to the Internet.

According to some aspects, an apparatus comprises a processor for establishing a secure tunnel to a mobile station, the mobile station connecting to a 3G network over a WLAN; a receiver for receiving calls from the mobile station over the established tunnel; and a traffic router for routing voice calls to a SIP GW associated with the 3G network and routing data calls to the Internet.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
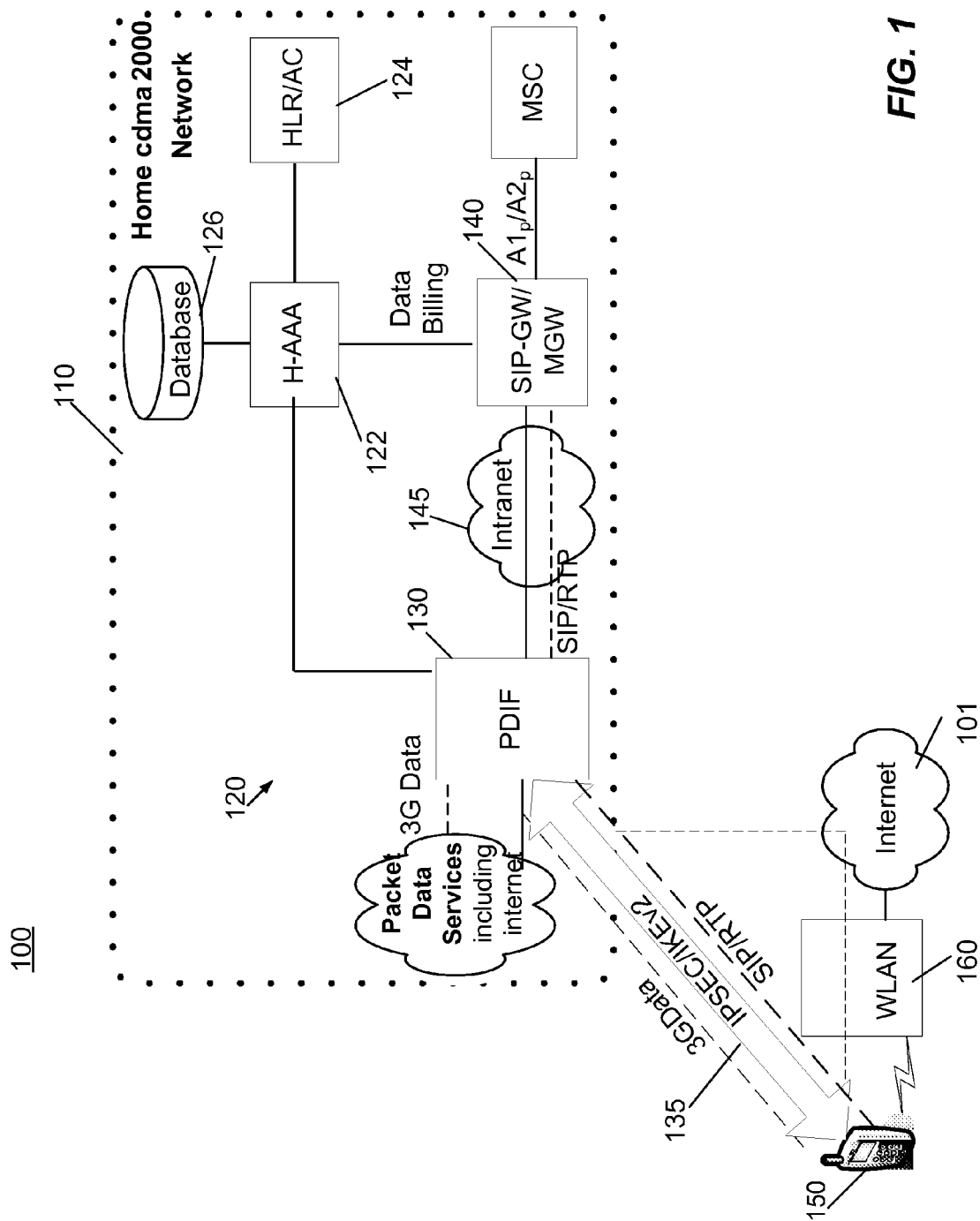
FIG. 1 is an exemplary communication system implementing various discloses aspects.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

FIG. 1 depicts an internetworking architecture 100 for providing access to a wireless subscriber network, such as 3G network 110, over an untrusted network, such as wireless local area network (WLAN). 3G network 110 may be, for example, a cdma2000 network, and may include a mobile switching center (MSC) 120, a packet data internetworking function (PDIF) 130, a session initiation protocol (SIP) gateway (GW) 140, home authentication, authorization, and accounting (H-AAA) server 122, home location register/authentication center (HLR/AC) 124, and database 126.

A mobile station (MS) 150 may connect to 3G network 110 via WLAN access point (AP) 160. WLAN AP 160 also provides a connection to the Internet 101. While MS 150 is depicted as a mobile telephone, other mobile and non-mobile devices may also be used such as, for example, a laptop computer. WLAN AP 160 may provide IEEE 802.xx, where "xx" stands for a version number such as "11", wireless connectivity. Other connectivity protocols may also be used such as, for example, WiMax, DSL, and/or other connectivity protocols.

H-AAA 122 authenticates and authorizes MS 150 access to network services. MSC 120 switches traffic originating or terminating at wireless device 150. MSC 120 may provide an interface for user traffic between the wireless network and other public switched networks or other MSCs. HLR/AC 124 stores location data associated with all connected mobile stations, such as MS 150. SIP GW 140 processes and routes voice over IP (VoIP) calls.

PDIF 130 provides access to packet data services by providing IP connectivity to the 3G network 110. The PDIF 130 may support secure tunnel management procedures between itself and MS 150, including establishment and release of the tunnel, allocation of an IP address to the MS from 3G network 110, and encapsulation and decapsulation of traffic to and from MS 150. PDIF 130 may also be configured to enforce policies of the 3G network 110. Additionally, PDIF 130 may be configured to collect and report accounting/billing information.

MS 150 may establish a secure IP tunnel 135 with PDIF 130, wherein the tunnel established is authenticated and authorized by the H-AAA 122. After the tunnel has been established, the MS 150 may access services in the 3G home network 110. Internet Key Exchange version 2 (IKEv2) or other security protocols may be used to establish a secure IP-Sec tunnel with the PDIF. According to some aspects, the PDIF 130 may be located in the home network of the MS. In other aspects, it may be located in a visited network.

As indicated by the dashed line labeled 3G data, data calls may be routed from the MS 150 to the PDIF 130 and forwarded to the Internet 101. Thus, the MS is authenticated using the 3G backend authentication procedures while still allowing connectivity over the public Internet. As indicated by the dashed line labeled SIP/RTP, voice over IP (VoIP) calls are routed through the tunnel to the PDIF, and then forwarded on to the SIP GW 140 and other components of the home network. Regular IP routing may be used to route SIP/RTP traffic to the SIP GW.

Figure 2:
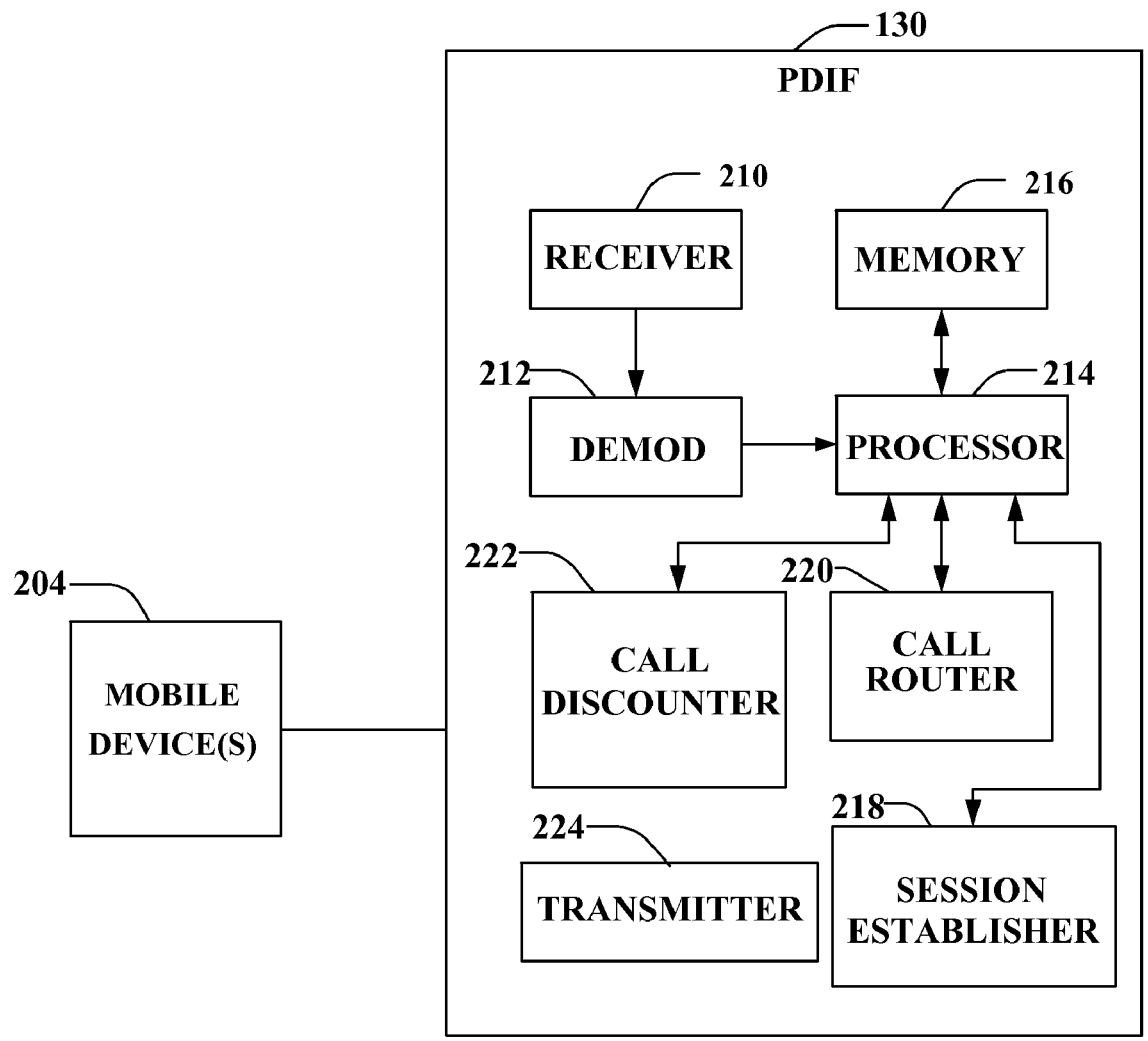
FIG. 2 depicts and exemplary PDIF, in accordance with various aspects.

FIG. 2 depicts PDIF 130 in further detail. PDIF 130 may comprise a receiver 210 that receives signals from one or more mobile devices 204 (such as MS 150) and a transmitter 224 that transmits to the one or more mobile devices 204. Receiver 210 may be operatively associated with a demodulator 212 that demodulates received information. Demodulated symbols may be analyzed by a processor 214, which is coupled to a memory 216 that stores information related to session establishment and data routing as well as other suitable information.

PDIF 130 may also include a session establisher 218, for facilitating a connection from a MS to the 3G cellular network. Session establisher 218 may be configured to establish a secure tunnel to the MS, and to facilitate authentication of the MS prior to establishing a connection to the network. As described herein, the secure tunnel may be an IPSec tunnel.

A call router 220 may also be included. Call router 220 receives calls from a MS, and determines whether the call is a voice call or a data call. Call router 220 then routes the call accordingly. More particularly, voice calls may be routed through a SIP GW associated with the 3G network, while data calls may be routed over the Internet.

PDIF 130 may further include a call discounter 222. As described above, PDIF 130 may be configured to collect and report accounting information. For example, PDIF 130 may maintain a list of calls received. Information may include, for example, the source of the call, the destination, the duration, call type (e.g., data or voice), and/or other information. The call information is then forwarded to the H-AAA for billing. For data calls, this is not a problem as the call is not processed by other components of the 3G network. However, VoIP calls are further processed by the SIP GW, MSC, and HLR/AC. The HLR/AC also forwards the VoIP calls to the H-AAA for billing, which would result in some double billing.

According to exemplary aspects, the call discounter 222 may be configured to discount voice calls. In conjunction with the call router 220, the call discounter 222 determines whether a call is a voice call prior to forwarding the call information to the H-AAA. If a call is determined to be a voice call, the call discounter 222 may be configured to remove the call from its billing records.

Figure 3:
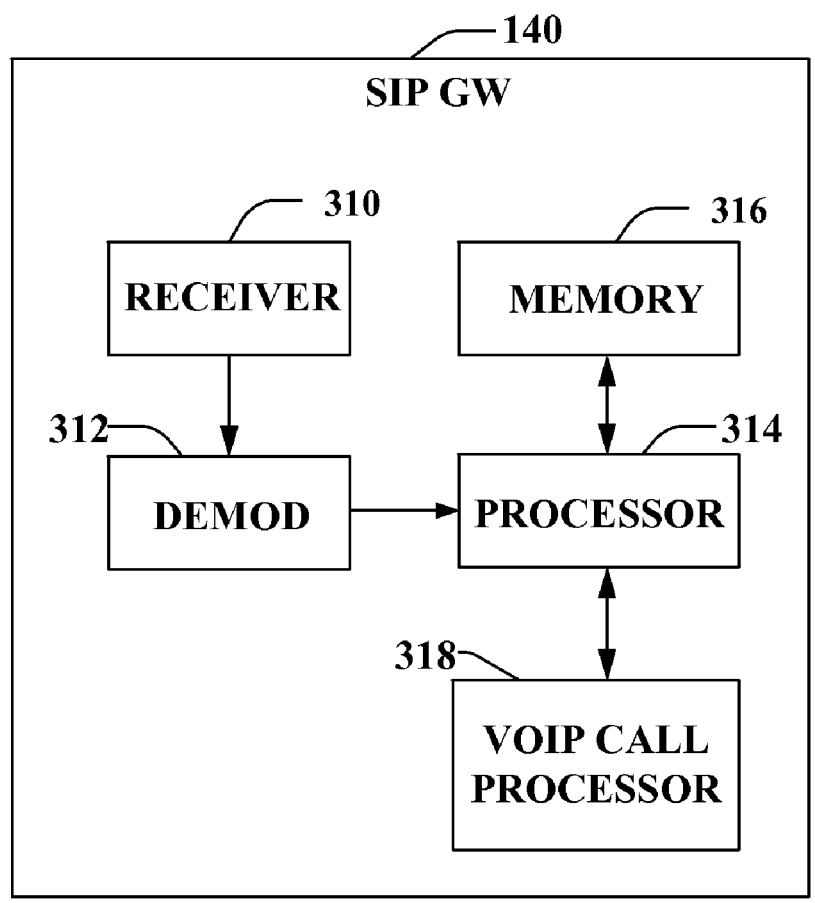
FIG. 3 depicts an exemplary SIP GW, in accordance with some aspects.

SIP GW 140 is depicted in further detail in FIG. 3. SIP GW 130 facilitates session establishment and authentication, as well as routing of VoIP calls between a mobile device and a 3G network (such as 3G network 110). SIP GW 130 may comprise a receiver 310 that receives signals VoIP calls from a PDIF (such as PDIF 130 depicted in FIGS. 1 and 2). Receiver 310 may be operatively associated with a demodulator 312 that demodulates received information. Demodulated symbols may be analyzed by a processor 314, which is coupled to a memory 316 that stores information related to session establishment and data routing as well as other suitable information. Processor 314 may be coupled to voice call processor 318. Voice call processor 318 routes voice calls on an A2 link to the MSC.

Figure 4:
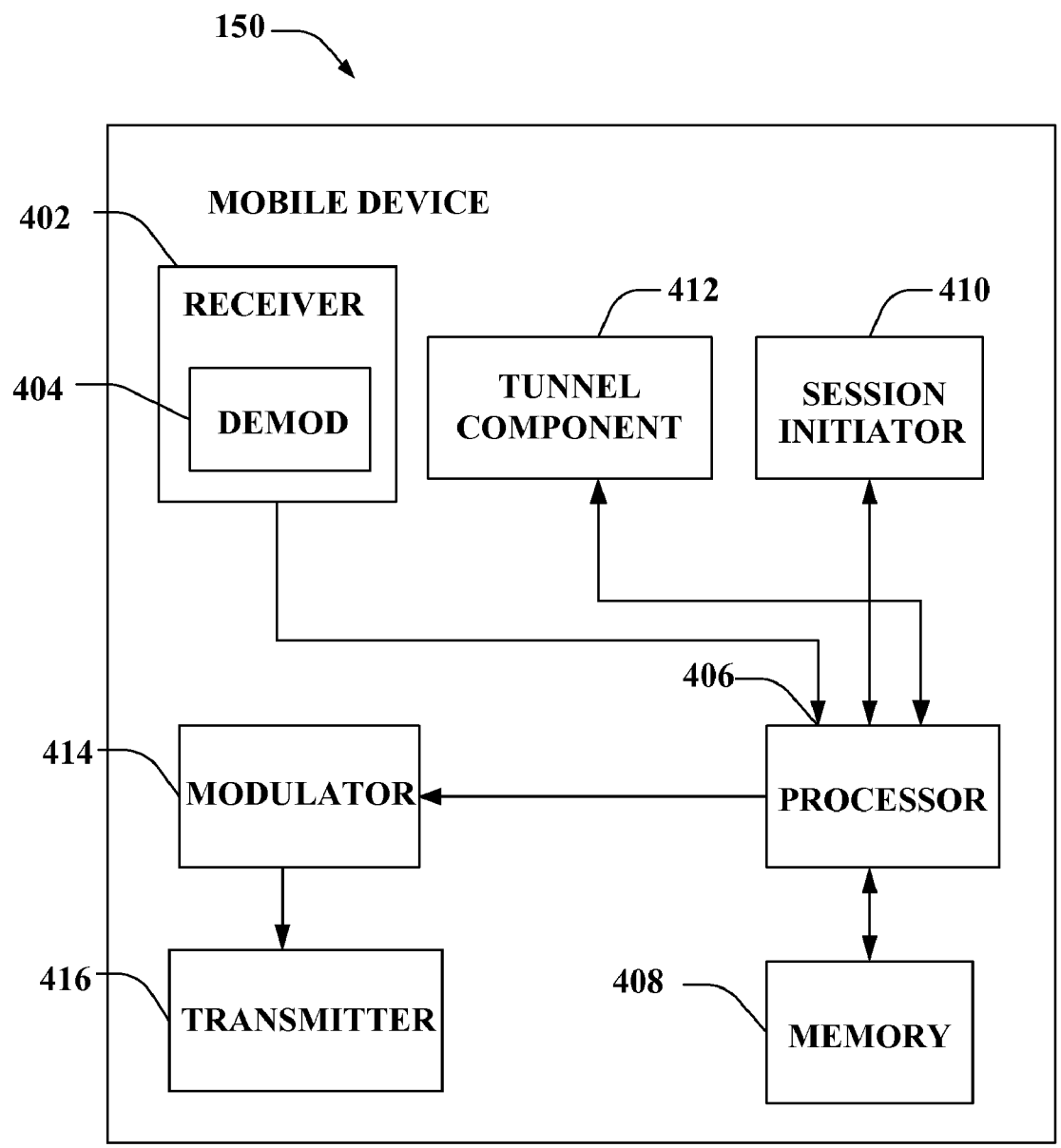
FIG. 4 depicts is an exemplary mobile station, in accordance with some aspects.

FIG. 4 is an example of a mobile station 150 that may implement various disclosed aspects. MS 150 may achieve data connectivity to 3G network 110 via WLAN or normal 3G cellular network connectivity procedures. MS 150 may comprise a receiver 402 that receives a signal from, for example, a receive antenna (not shown), performs typical actions (e.g., filters, amplifies, downconverts, etc.) the received signal, and digitized the conditioned signal to obtain samples. MS 150 may also comprise a demodulator 404 that can demodulate received symbols and provide them to a processor 406. Processor 406 may be a processor dedicated to analyzing information received by receiver 402 and/or generating information for transmission by a transmitter 416 operatively coupled to a modulator 414, a processor that controls one or more components of MS 150, and/or a processor that both analyzes information received by receiver 402, generates information for transmission by transmitter 416, and controls one or more components of MS 150.

MS 150 may additionally comprise memory 408 that is operatively coupled to processor 406 and that can store data to be transmitted, received data, information related to network connectivity, and/or any other suitable information. MS 150 may additionally store protocols and/or algorithms associated with network connectivity or other functions performed by MS 150. It will be appreciated that memory 408 may be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PRROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 408 is intended to comprise, without being limited to, these and any other suitable types of memory.

Processor 406 may further be operatively coupled to a session initiator 410 that can facilitate a connection to the 3G network. MS 150 may be a multi-mode device, capable of connecting to the 3G network via more than one connection procedure. For example, MS 150 may be configured to connect to the 3G network via WiFi (over WLAN 160), or using the connection mechanisms provided by the 3G network (e.g., cdma2000). Session initiator 410 may be configured to select an appropriate connection mode. According to some aspects, session initiator 410 may be configured to always connect via a WiFi connection if WiFi connectivity is detected. In other aspects, session initiator 410 may be configured to select the strongest connection, or the connection which will provide a specified quality of service level. In still other aspects, session initiator 410 may be configured to enable a user of MS 150 to select a preferred connection method on a case-by-case basis.

MS 150 may also include a tunnel component 412 which facilitates generating an IPSec tunnel to the PDIF (as depicted in FIG. 1). Both voice and data traffic may be routed through an established tunnel. SIP/RTP traffic, which relates to VoIP calls, rides on top of UDP encapsulated packets. UDP encapsulation addresses NAT traversal. Tunnel component 412 may exchange IKEv2 messages with the PDIF. IKE performs mutual authentication and establishes an IKE security association (SA) that includes shared secret information that can be sued to efficiently establish SAs for Encapsulating Security Payload (ESP) and a set of cryptographic algorithms to be used by the SAs to protect the traffic that they carry.

According to some aspects, intra-user flow differentiation may be performed through the use of additional child SAs. One child SA may be created for data traffic and a second child SA for voice traffic. In some aspects, the SAs may be used by the PDIF to differentiate voice and data traffic. Encryption may be enabled or disabled on an individual flow basis.

Figure 5:
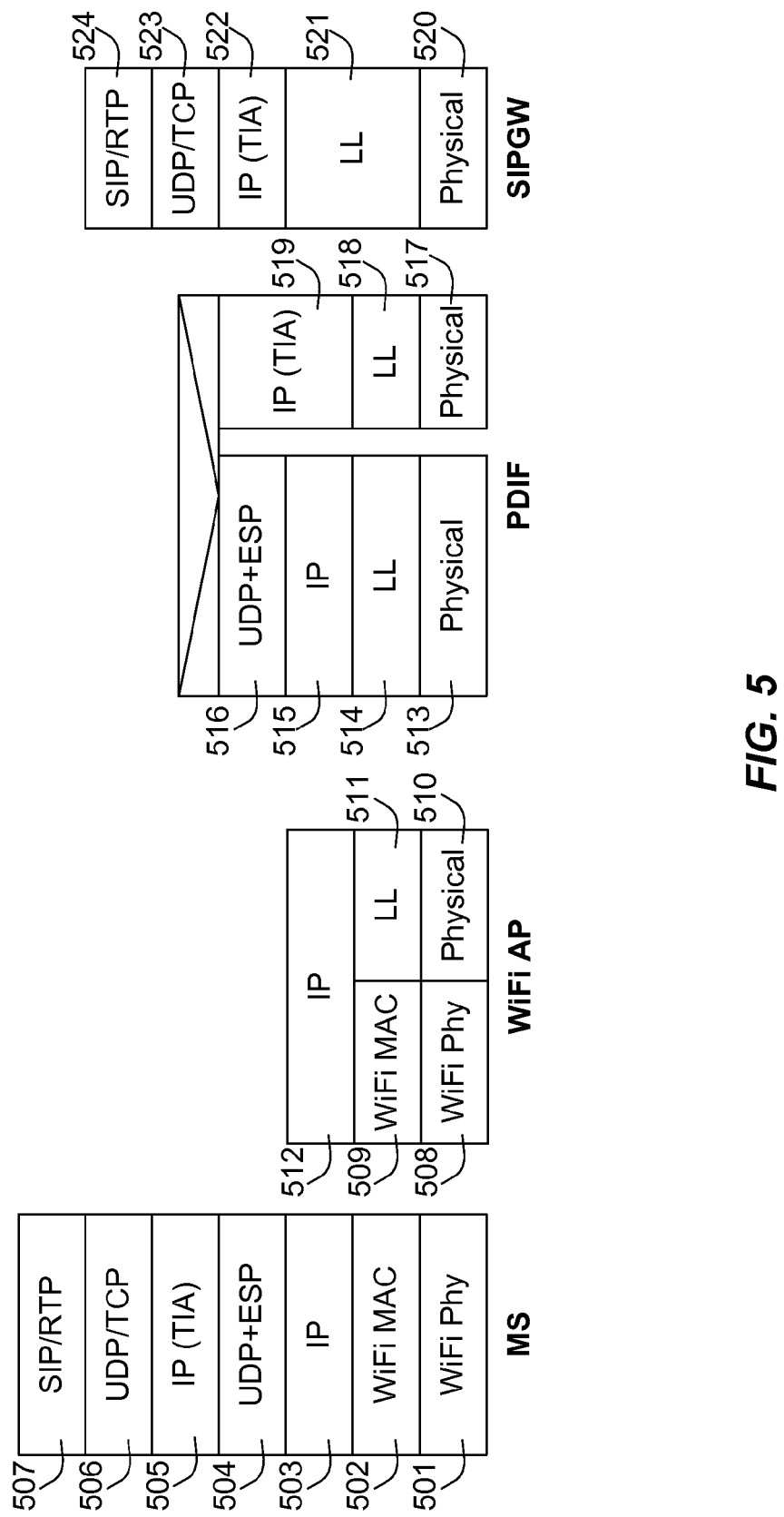
FIG. 5 depicts a protocol stack, in accordance with some aspects

FIG. 5 depicts a protocol stack configuration, in accordance with various disclosed aspects. MS 150 includes a WiFi Physical layer 501, a WiFi medium MAC layer 502, an IP layer 503, a UDP+ESP encapsulation layer 504, an IP (TIA) layer 505, a UDP/TCP layer 506, and a SIP/RTP layer 507. WiFi AP 160 includes, on the mobile facing side, a WiFi Physical layer 508 and a WiFi MAC layer 509. On the PDIF facing side, the WiFi AP 160 includes a Physical layer 510 and a logical link (LL) layer 511. An IP layer 512 is also included.

The PDIF includes, on the WiFi AP facing side, a physical layer 513, link layer 514, IP layer 515, and UDP+ESP layer 516. A physical layer 517, link layer 518, and IP (TIA) layer 519 are included on the SIP GW facing side. The SIP GW includes physical layer 520, link layer 521, IP (TIA) layer 522, UDP/TCP layer 523, and SIP/RTP layer 524.

In operation, both voice and data calls from the mobile station are carried over an IPSec tunnel. Data traffic is UDP encapsulated over the IPSec tunnel, as depicted at 504. SIP/

RTP traffic, for VoIP calls, may also be UDP encapsulated and passed through the tunnel using IKE security methods. Both data and voice traffic are encapsulated and transmitted as IP packets via the WiFi AP. At the PDIF, data traffic, which is UDP+ESP+TIA encapsulated, is deframed and routed to the Internet. Voice calls are routed to the SIP GW as IP packets, and deframed at the SIPGW.

Figure 6:
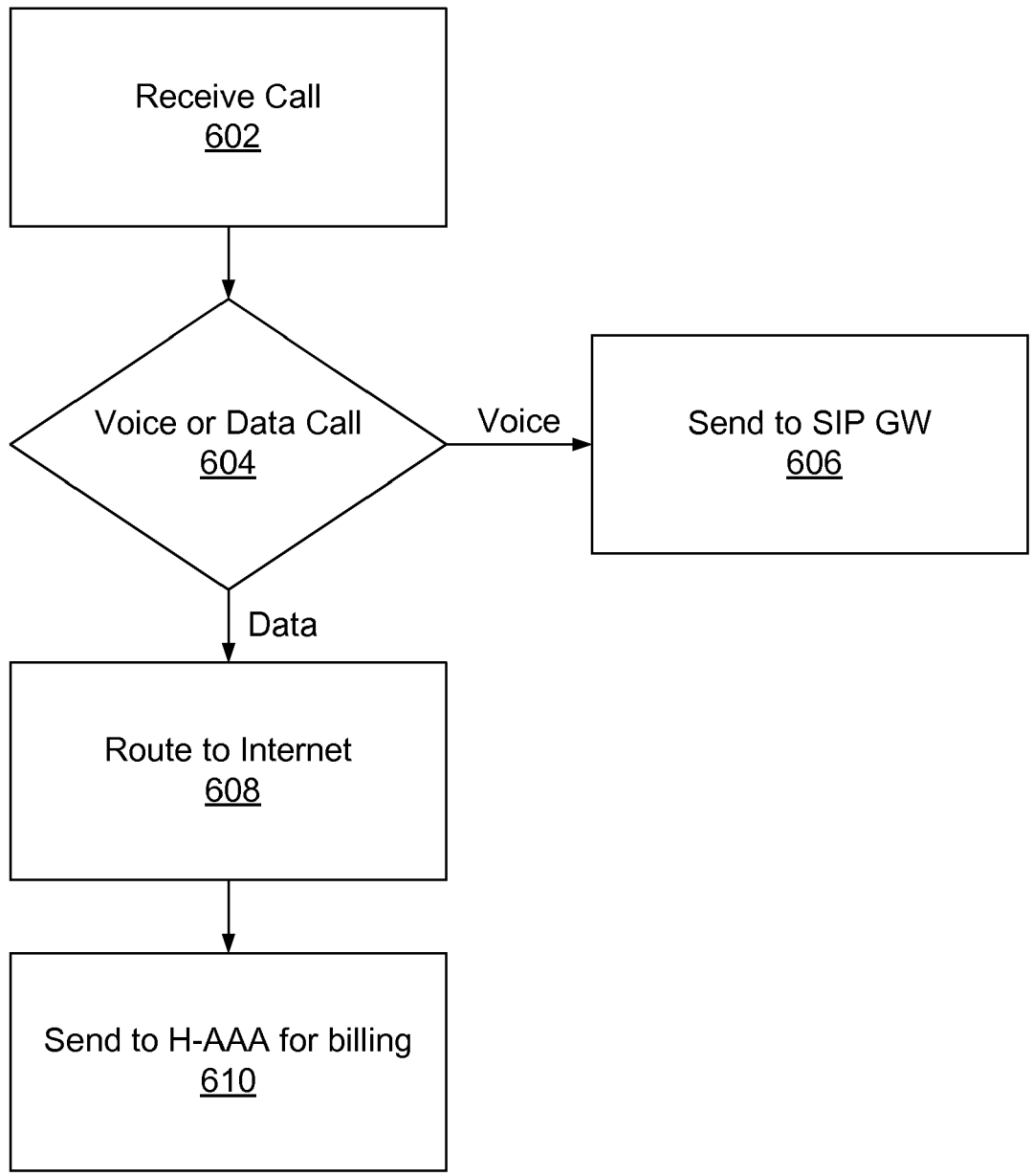
FIG. 6 is a flowchart depicting various discloses aspects.

FIG. 6 is a flowchart depicting various disclosed aspects. According to some aspects, the steps depicted may be performed at a PDIF. As depicted at 602, the PDIF may receive a call. The call may be UDP encapsulated and received over an IPSec tunnel. The PDIF determines whether the call is a voice call or a data call, as depicted at 604. Voice calls may be routed to the SIP GW for further processing, as depicted at 606.

Data traffic may be routed to the internet, as depicted at 608. As described herein, the PDIF may also be configured to collect and report accounting information. As depicted at 610, the PDIF may send only data related to data calls to the H-AAA for billing. This prevents double billing which may occur if the PDIF also sent records regarding voice calls.

When the aspects described herein are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 7:
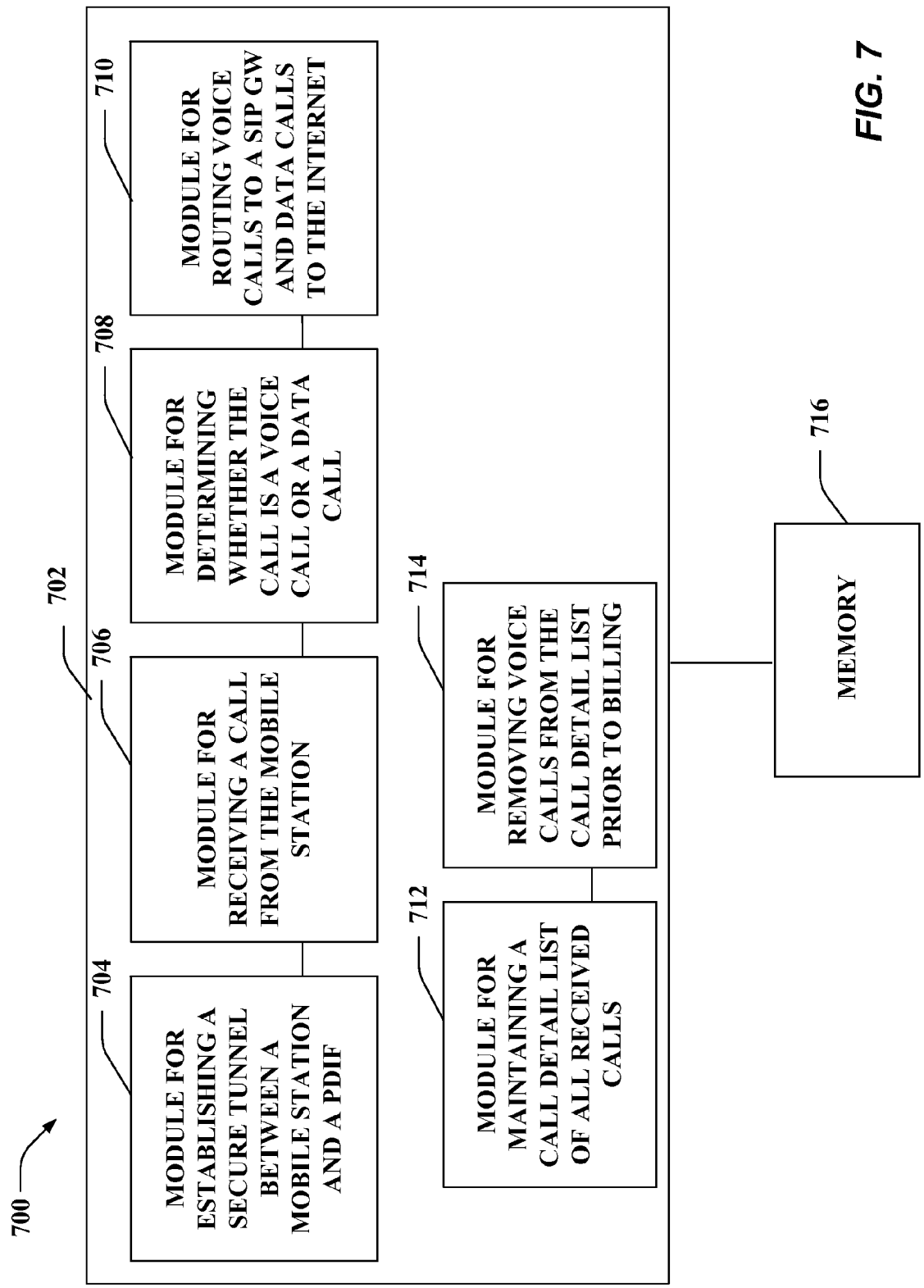
FIG. 7 an illustration of an example methodology that facilitates connecting to a 3G network, in accordance with some aspects.

Turning to FIG. 7, illustrated is a system 700 that receives requests from one or more mobile devices for data connectivity to wireless subscriber network over an untrusted network. System 700 can reside within a PDIF, for example. As depicted, system 700 includes functional blocks that can represent functions implemented by a processor, software, or combination thereof (e.g., firmware). System 700 includes a logical grouping 702 of electrical components that act in conjunction. Logical grouping 702 can include a module establishing a secure tunnel between the mobile station and a packet data internetworking function (PDIF) associated with the wireless subscriber network 704. Moreover, logical grouping 702 can include a module for receiving a call from the mobile station over the established tunnel 706. The logical grouping 702 may also include a module for determining whether the call is a voice call or a data call 708. Logical grouping 702 may further include a module for routing voice calls to a SIP gateway and routing data calls to the Internet 710.

Logical grouping 702 may further comprise a module for maintaining a call detail list of all received calls 712, and a module for removing all voice calls from the call detail list prior to forwarding the call detail list to an accounting server associated with the wireless subscriber network 714. Additionally, system 700 can include a memory 716 that retains instructions for executing functions associated with electrical components 704-714. While shown as being external to memory 716, it is to be understood that electrical components 704-714 can exist within memory 716.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for processing calls from a mobile station connecting to a wireless subscriber network over a wireless local area network (WLAN), comprising:
    establishing a secure tunnel between the mobile station and a packet data internetworking function (PDIF) associated with the wireless subscriber network;
    receiving a call from the mobile station over the established tunnel;
    determining whether the call is a voice call or a data call;
    upon determining that the call is a voice call, routing the call to a session initiation protocol (SIP) gateway (GW);
    upon determining that the call is a data call, routing the call to the Internet;
    maintaining a call detail list for all received calls; and
    removing all voice calls from the call detail list prior to forwarding the call detail list to an accounting server associated with the wireless subscriber network.

2. The method of claim 1, wherein the tunnel comprises an IPSec tunnel.

3. The method of claim 1, wherein determining whether a call is a voice call or a data call is based, at least in part, on a security association configured while establishing the secure tunnel.

4. The method of claim 3, wherein a first security association represents a voice call and a second security association represents a data call.

5. The method of claim 1, wherein the PDIF is located in a home network associated with the mobile station.

6. The method of claim 1, wherein the PDIF is located in a visited network.

7. An apparatus, comprising:
    means for establishing a secure tunnel between the mobile station and a packet data internetworking function (PDIF) associated with a wireless subscriber network;
    means for receiving a call from the mobile station over the established tunnel;
    means for determining whether the call is a voice call or a data call;
    upon determining that the call is a voice call, means for routing the call to a session initiation protocol (SIP) gateway (GW);
    upon determining that the call is a data call, means for routing the call to the Internet;
    means for maintaining a call detail list for all received calls; and
    means for removing all voice calls from the call detail list prior to forwarding the call detail list to an accounting server associated with the wireless subscriber network.

8. An apparatus, comprising:
    a processor for establishing a secure tunnel to a mobile station, the mobile station connecting to a wireless subscriber network over a WLAN;
    a receiver for receiving calls from the mobile station over the established tunnel;
    a traffic router for routing voice calls to a SIP GW associated with the wireless subscriber network, and routing data calls to the Internet; and
    a memory for storing a call detail list for all received calls, the call detail list being generated by the processor,
    wherein the processor is further configured to remove all voice calls from the call detail list prior to forwarding the call detail list to an accounting server associated with the wireless subscriber network for billing.

9. The apparatus of claim 8, wherein the tunnel comprises an IPSec tunnel.

10. The apparatus of claim 8, wherein the data router is configured to route voice and data calls based, at least in part, on a security association configured while establishing the secure tunnel.

11. The apparatus of claim 10, wherein a first security association represents a voice call and a second security association represents a data call.

* * * * *